United States Patent [19]
Antrim et al.
[11] 4,089,745
[45] * May 16, 1978

[54] PROCESS FOR ENZYMATICALLY CONVERTING CELLULOSE DERIVED FROM CORN HULLS TO GLUCOSE

[75] Inventors: Richard Lee Antrim, Clinton; Donald Wayne Harris, Camanche, both of Iowa

[73] Assignee: Standard Brands Incorporated, New York, N.Y.

[ * ] Notice: The portion of the term of this patent subsequent to Jul. 26, 1994, has been disclaimed.

[21] Appl. No.: 754,727

[22] Filed: Dec. 27, 1976

[51] Int. Cl.$^2$ .............. C12D 13/02
[52] U.S. Cl. .............. 195/33
[58] Field of Search .............. 195/31 R, 33, 8, 9; 127/37; 536/1, 56

[56] References Cited

U.S. PATENT DOCUMENTS

| | | | |
|---|---|---|---|
| 1,864,746 | 6/1932 | Legg et al. | 195/33 |
| 2,801,955 | 8/1957 | Rutenberg et al. | 195/9 |
| 3,764,475 | 10/1973 | Mandels et al. | 195/33 |
| 3,812,012 | 5/1974 | Buschmann et al. | 195/33 |
| 4,038,481 | 7/1977 | Antrim et al. | 536/56 |

OTHER PUBLICATIONS

Andren et al., "Production of Sugars From Waste Cellulose by Enzymatic Hydrolysis, Part I: Primary Evaluation of Substrates;" presented at 8th Cellulose Conference, SUNY, Syracuse, N.Y., May 19-23, 1975.

Spano et al., *Enzymatic Hydrolysis of Cellulose Wastes to Glucose,* Publication from U.S. Army Natick Development Center, Sep. 8, 1975.

Andren et al., "Production of Sugars From Waste Cellulose by Enzymatic Hydrolysis: Primary Evaluation of Substrates," *Process Biochemistry,* Oct. 1976, pp. 2-11.

Hajny et al., *Cellulases and Their Applications,* American Chemical Society, Washington, D.C., (1969) pp. 244, 323, 324.

*Primary Examiner*—Raymond N. Jones
*Assistant Examiner*—Thomas G. Wiseman

[57] ABSTRACT

Corn hulls are subjected to a liquid extraction treatment whereby the major portion of the cellulose is liberated from the other constituents of the corn hulls and the resulting cellulose fraction is enzymatically treated to convert a substantial portion thereof to glucose.

5 Claims, No Drawings

PROCESS FOR ENZYMATICALLY CONVERTING CELLULOSE DERIVED FROM CORN HULLS TO GLUCOSE

BACKGROUND OF THE INVENTION

1. Field of the Invention

This invention relates to the enzymatic treatment of the cellulose portion of corn hulls to convert a substantial portion thereof to glucose.

2. Description of the Prior Art

Cellulose is the earth's most abundant resource. The estimated annual accretion, including trees and annual plants, is on the order of 22 billion tons as compared to 100 million tons for corn starch. In contrast to oil and coal, cellulose is a directly renewable resource. The energy for its synthesis comes from the sun and its building blocks are derived from $CO_2$ in the atmosphere.

Cellulose is a water-insoluble polymer of linearly linked $\beta$-1,4 glucose residues and may be hydrolyzed to sugars. Intertwining of long cellulose chains into fibrils and fibers is involved in imparting crystallinity and insolubility to the polymer. Cellulose occurs naturally in perennial and annual plants as cell wall structural material and in fungi and even in certain bacteria. Sources which are generally considered to be of potential commercial importance for conversion of cellulose into sugars or other chemicals include the following:

Wood and lumbering by-products
Pulp and paper wastes
Industrial and municipal wastes
Annual plant wastes
Agricultural residues
Food processing residues The state of the art of cellulose conversion through mid-1974 was presented at an NSF-sponsored symposium entitled "Cellulose as a Chemical and Energy Resource," University of California at Berkeley, June 25–27, 1974. The proceedings were published as Symposium No. 5 of *Biotechnology and Bioengineering*, C. R. Wilke, Editor, published by John Wiley & Sons, Inc., New York, N. Y., 1975.

The state of the art through mid-1975 was presented at (1) the Eighth International Cellulose Conference, SUNY College of Environmental Science and Forestry, Syracuse, New York, May 19–23, 1975, and (2) Symposium on Enzymatic Conversion of Cellulose Materials: Technology and Applications, U.S. Army Natick Development Center, Natick, Mass. Sept. 8–10, 1975.

Particularly pertinent publications relating to the conversion of cellulose waste products to glucose are: Andren, Robert K. et al., "Production of Sugars from Waste Cellulose by Enzymatic Hydrolysis, Part I: Primary Evaluation of Substrates;" Presented at 8th Cellulose Conference, SUNY, Syracuse, NY, May 19–23, 1975, and Spano, L. A. et al., "Enzymatic Hydrolysis of Cellulose Wastes to Glucose," Publication from U.S. Army Natick Development Center, Sept. 8, 1975.

OBJECTS

It is the principal object of the present invention to provide a process for enzymatically converting cellulose derived from corn hulls to glucose.

This object and other objects and advantages will be apparent from the present specifications and the appended claims.

SUMMARY OF THE INVENTION

Corn hulls are subjected to a liquid extraction treatment whereby the major portion of the cellulose is liberated from the other constituents of the corn hulls and the resulting cellulose fraction is enzymatically treated to convert a substantial portion of the cellulose to glucose.

DETAILED DESCRIPTION OF THE INVENTION

Corn hulls from a wet milling operation contain relatively large amounts of impurities in admixture with the fibrous, corn hull fraction. These impurities are in the form of "fine material" and contain the predominant amount of non-fibrous substances, such as a starch, protein, oil containing material, lignified tip cap, etc. Removal of these materials may be accomplished by any convenient method, for instance, by screening through a screen of 6 U.S. Standard mesh. The particle size range of the corn hulls containing the predominant amount of impurities may vary, of course, depending upon the particular manner in which the corn hulls are treated and handled during the milling operation. Residual starch which may be present in the corn hulls after the screening operation can be removed by an enzymatic solubilization treatment, for instance, with alpha-amylase.

The relatively purified corn hulls may be considered to comprise three predominant substances or materials: a cellulose fraction, a hemicellulose fraction and a non-carbohydrate fraction. A specific process for obtaining these fractions is disclosed in our U.S. Pat. application Ser. No. 689,232 filed May 24, 1976, now U.S. Pat. No. 4,038,481, entitled "Method for Treatment of Corn Hulls" which is incorporated herein by reference.

These fractions are obtained by contacting corn hulls with a sufficient amount of alkali to hydrolyze the hulls to affect liberation of the hemicellulose fraction so that it may be solubilized in water and to solubilize the non-carbohydrate fraction. Three fractions are recovered comprising a water solution of hemicellulose, an organic solvent extract of the non-carbohydrate fraction and an insoluble residue comprising the cellulose fraction.

In the preferred process for obtaining the cellulose fraction to be enzymatically saccharified, the alkaline hydrolysis is performed using an aqueous system wherein the hemicellulose and the non-carbohydrate fractions are solubilized leaving behind the insoluble cellulose fraction.

The two other fractions may be recovered by adding a sufficient amount of water miscible organic solvent to the alkaline solution to precipitate the hemicellulose. Exemplary of water-miscible organic solvents which may be utilized are acetone, methanol, ethanol, propanol, isopropanol, secondary butyl alcohol, tertiary butyl alcohol and mixtures thereof. The solvent supernate contains the non-carbohydrate fraction and this fraction may be recovered by any convenient means, for instance, by evaporating the solvent.

Cellulase derived from Aspergillus species, *Trichoderma viride*, or other cellulose producing organisms may be used for converting the cellulose fraction to glucose. The conditions under which the cellulose fraction is treated with the cellulase may vary widely but, in general, the conditions are those which the prior art has recognized as being optimum for this enzyme.

Surprisingly, the cellulose derived from corn hulls is extremely susceptible to enzymatic saccharification. Because of this, lesser quantities of enzyme are necessary to achieve a relatively high degree of conversion compared to cellulose derived from a number of other sources. Also, the desired degree of conversion can be achieved in a shorter period. While we do not wish to be bound to any theory or explanation for this phenomenon, it may be due to the particular form or structure of the liberated corn hull cellulose. It has been observed that the cellulose derived from corn hulls has a higher degree of water absorptivity than other types of cellulose which indicates that the former has a more open structure. This apparently permits easy access of the enzyme to the cellulose fibers where the enzyme can more readily catalyze the degradation of the cellulose to glucose.

In order to more clearly describe the nature of the present invention, a specific example will hereinafter be described. It should be understood, however, that this is done solely by way of example, and is intended neither to delineate the scope of the invention nor limit the ambit of the appended claims.

EXAMPLE

This Example illustrates the treatment of cellulose derived from corn hulls with cellulase derived from Aspergillus sp. also compares the amount of glucose formed by this treatment with the amount of glucose formed by treating another source of cellulose.

Corn hulls from a wet milling operation were wet screened through a 6 screen at about 50° C to substantially remove the fine fiber, most of the starch and some of the protein and lipid material present. 9.5 kilos, dry basis, of the screened material having a moisture content of 65 percent was mixed with 5.7 liters of water in a 190 liter jacketed tank. To the mixture held at a temperature of 70° C was added 635 g of calcium oxide and the mixture stirred for three hours. Portions of the mixture were processed in 3.785 liter Waring blender in a batchwise fashion for thirty seconds. Water was added during blending to promote mixing. A total of 84 liters of water was utilized.

The material was dewatered in a centrifuge to separate the soluble hemicellulose and non-carbohydrate from the cellulose cake. The cellulose cake was then slurried in about 84 liters of water and again centrifuged. The cake was then reslurried, screened through a U.S. No. 20 mesh screen to remove tip caps and hull materials, and again dewatered by centrifugation.

As a control cellulose preparation, 5 g of C-100 bleached sulfite pulp (International Filler Corp., North Tonawanda, N.Y.) was pretreated by suspension in 200 ml of deionized water. The pH of the suspension was adjusted to 12.4 with 50 percent NaOH solution. The suspension was then held at ambient temperature for one hour, filtered, and the resultant cake washed with water to a pH of 8.5.

5 g of corn hull cellulose having a moisture content of about 92 percent, prepared as described above, and 5 g of the pretreated C-100 sulfite pulp were individually suspended in 200 ml of deionized water. The suspensions were buffered with 0.7 ml of glacial acetic acid and the pH adjusted to 4.3 with NaOH solution. 560 mg of cellulase AP 3 containing 30,000 units of Aspergillus sp. cellulase per gram (Amano Pharmaceutical Co., Ltd., Nagoya, Japan) was added to each suspension and the reaction held at a temperature of 50° C for sixteen hours. The final reaction pH was 4.3. After sixteen hours the suspensions were filtered and the glucose content of the filtrates determined as reducing sugar by a Fehling's solution method. The results are shown in Table I:

TABLE I

| | Glucose Yield | |
|---|---|---|
| | Based on Approx. Cellulose Content (%, d.b.) | Based on Total Solids (%, d.b.) |
| C-100 Cellulose | 10 | 10 |
| Corn Hull Cellulose | 58 | 35 |

The data in Table I show that treatment of corn hull cellulose prepared by the process of the present invention with cellulase derived from Aspergillus sp. resulted in the production of almost six times as much glucose on an approximate cellulose content basis and 3.5 times as much glucose on a total solids basis as did similar treatment of bleached sulfite pulp.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A process for enzymatically converting corn hull cellulose to glucose comprising treating corn hulls with a sufficient amount of alkali to hydrolyze the hulls to affect liberation of a hemicellulose fraction, a non-carbohydrate fraction and a cellulose fraction and enzymatically treating the cellulose to convert a substantial portion thereof to glucose.

2. A process for enzymatically converting corn hull cellulose to glucose as defined in claim 1, wherein alkaline hydrolysis of the hulls is performed using an aqueous system whereby the hemicellulose and non-carbohydrate fractions are solubilized, recovering the solubilized fractions from the insoluble residue comprising the cellulose fraction, treating the solubilized fractions with a water miscible organic solvent to precipitate the hemicellulose, recovering the non-carbohydrate fraction from the organic solvent, and enzymatically treating the recovered cellulose fraction to convert a substantial portion thereof to glucose.

3. A process for enzymatically converting corn hull cellulose to glucose as defined in claim 2, wherein the cellulose is treated with a cellulase enzyme.

4. A method of enzymatically converting corn hull cellulose to glucose as defined in claim 3, wherein the cellulase is derived from *Trichoderma viride.*

5. A method of enzymatically converting corn hull cellulose of glucose as defined in claim 3, wherein the cellulase is derived from Aspergillus species.

* * * * *